Sept. 27, 1955  A. J. ROGER  2,718,663
INJECTION MOLDING MACHINE
Filed Sept. 30, 1949
FIG. 1.
FIG. 2.
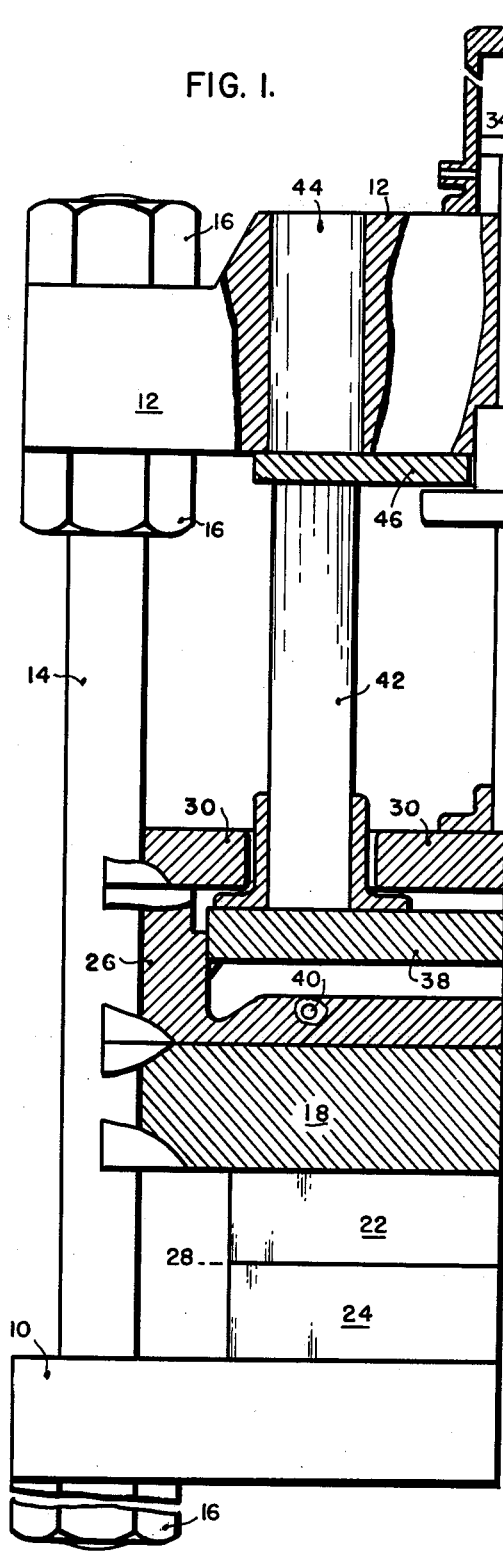
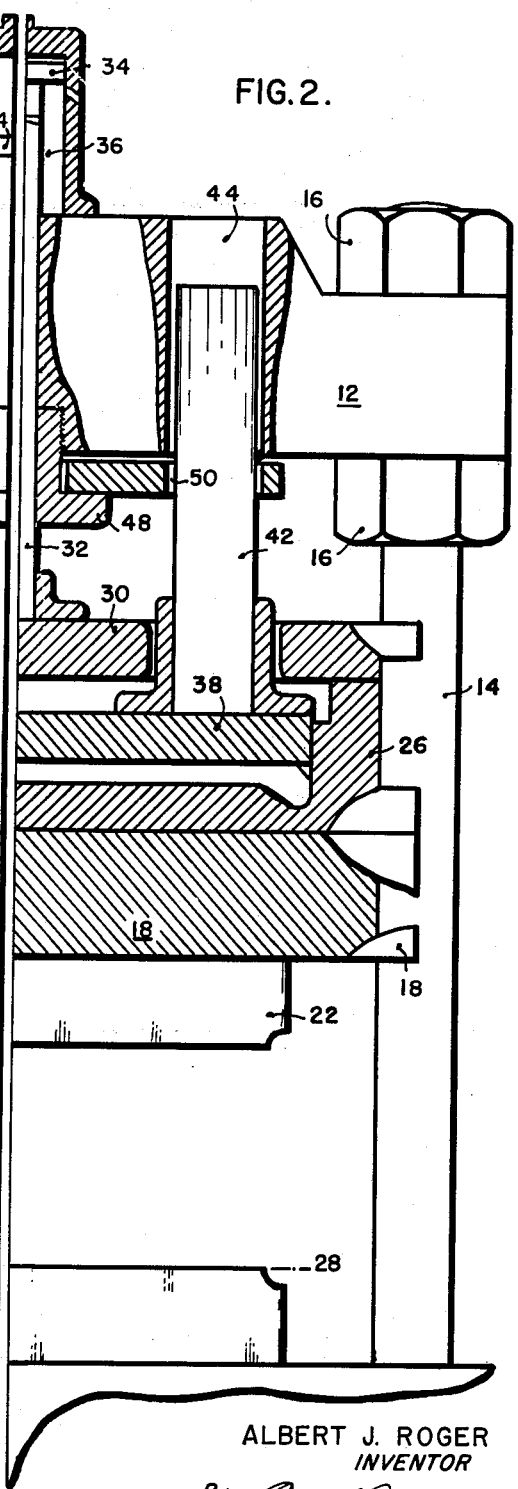
ALBERT J. ROGER
*INVENTOR*
By
*ATTORNEY*

United States Patent Office 2,718,663
Patented Sept. 27, 1955

2,718,663

INJECTION MOLDING MACHINE

Albert J. Roger, San Leandro, Calif., assignor to Crown Machine & Tool Company, Fort Worth, Tex., a corporation of Texas Application September 30, 1949, Serial No. 118,780

1 Claim. (Cl. 18—30)

This invention relates to devices by which two parts of an injection molding machine die are held firmly together while the material is forced into the mold cavity.

The gross thrusts developed incident to the injection and which tend to spread the two die parts apart while injection occurs, are proportional to the injection pressure and the area of the cavity at the parting plane. To resist this thrust adequately it has heretofore been the practice to utilize either toggle devices or hydraulic pistons either of which are of gigantic proportions determined by those gross thrusts. In the use of prior hydraulic piston devices, it has heretofore been the practice to move the movable platen to the stationary platen using the same hydraulic piston as is used to hold the die parts together while injection takes place. In such machines the space, piston displacements, power consumed, hydraulic fluid volumes, weights of machine parts, operation times, etc., are very great. These factors are costly ones and have deterred substantially the formation of articles of large surface area at the parting of the cavities and have often prohibited the formation of products having all three dimensions of large extent.

My invention largely overcomes these objections and it is, accordingly, the main object of this invention to provide die closing and clamping devices having high thrust; and low power, space, weight, fluid, and time consumption.

Other objects and advantages will appear from a consideration of the following specification wherein reference is made to the accompanying drawing in which the two figures taken together show the entire machine in elevation and fragmentarily in section, with Fig. 1 showing the left half of the machine in mold closed position, and Fig. 2 showing the right half of the machine in mold open position.

In the drawing the moving parts are shown at the right half of the figure in the mold open position, and at the left half of the figure the moving parts are shown in the mold closed position.

The machine comprises a rigid base structure having a lower platen 10, a top header plate 12 and a plurality (as four) of tie rods 14 secured to platen 10 and header 12 by nuts 16. The rods also form slideways for upper platen 18. To the platens there are respectively secured the mold or die cavities 22 and 24 by means (not shown) well known in the art.

The upper platen 18 is fastened to or includes a cylinder 26 of large internal diameter and cross section parallel to the parting plane 28 of the cavities, which cylinder 26 is secured to and by the spider or bridge member 30 to a vertical piston rod 32 which is driven by a small piston 34 in a cylinder 36. Piston 34 is utilized for the purpose of lowering to, and raising the platen 18 and movable cavity 22 up out of, injection position and for moving the cylinder 26 and member 30 with related structure to their working and retracted positions. Normally the fluid pressure in chamber 36 serves also to gently lower the upper platen into the closed position.

A thrust piston 38 is received in cylinder 26 and has a short stroke in the cylinder. A source of pressure 40 is connected to the expansion chamber of cylinder 26. Three thrust rods 42 are spaced one hundred and twenty degrees apart around the vertical axis $y$—$y$ of the machine and have a length such as to extend from piston 38 to a point below the lower face of header plate 12, parallel to axis $y$—$y$.

The header 12 is provided with three holes 44 in registry with rods 42 and sized to freely pass their upper ends. A blocking disc 46 is rotatably mounted on a bearing 48 supported centrally in header 12. Blocking disc 46 also has three holes 50 which may be placed in or out of registry with holes 44 simultaneously.

In operation, the plate 46 is placed as shown at the left so that it blocks upward movement of thrust rods 42 when injection is to take place. After the mold closure and before injection, fluid pressure is applied to the piston 38 through source 40 thus causing a large thrust to continuously hold the molds 22 and 24 together at parting plane 28. This pressure is maintained even though injection pressure tends to cause separation of the molds due to stretching of rods 14. The stroke of cylinder 26 is adequate to take up for all stretching, and the gross thrust of the piston 38 is maintained by a suitable pump at a great enough value to exceed the gross thrust due to the injection pressure.

Upon completion of injection, pressure is released from piston 38. Plate 46 is now freely rotated to register holes 50 with rods 42 and then piston 34 is forced upward to carry the cylinder 26, piston 38, platen 18 and cavity 22 upwardly.

It is evident that the movement of piston 38 while under holding pressure needs only to be a very slight amount, such as a few thousandths of an inch, sufficient to allow free rotation of plate 46 after pressure is taken off piston 38 and sufficient to compensate for any elongation of rods 14 etc.

It is also evident that the vertical distance between the open and closed positions of the moving platen may be greatly increased simply by increasing the lengths of the tie rods 14 and the thrust rods 42. It is particularly to be noted that the clearances between the parting faces of the cavities 22 and 24 are not limited by the rods 42 since these rods may be projected, when inactive, beyond header 12 as far as is necessary for removing the molded article, insertion of inserts, etc. Moreover, since the rods 42 move upward, the space used is readily and economically available toward the ceiling of the factory space allotted to the machine.

In the making of different articles, the vertical thicknesses of mold cavities 22 and 24 also differ. The stroke of piston 38 is not intended to take up for such variations; the piston and cylinder interfaces are provided largely only for the purpose of effecting a fluid seal. The variations in the thickness of molds 22 and 24 may be provided for by substituting rods 42 of different lengths, or by providing suitable vertical adjustment of plate 10 on its support.

It will be clear that devices other than those here disclosed may be employed to effect the same results without departing from the spirit of the invention. Thus, a diaphragm may be employed instead of piston 38 since little independent cylinder movement is necessary and a diaphragm responds well under such conditions. Also, in another construction, the rods 42 and plate 46 may be replaced by any shiftable obstruction to the movement of piston 38, such as clamps carried by piston 38 and adapted to be caused to grip rods 14 as soon as the cavities 22 and 24 are in contact and before pressure is applied in cylinder 26. In such case the holes 50 are also dispensed with, in addition to dispensing with the need for compensating for variations in mold thickness. Other alternatives to supply the function of plate 46 include, (1) a separate plate for reciprocation on the bottom surface of header 12, into and out of registration with holes 44 to obstruct or pass thrust rods 42, or (2) separate arms pivoted on the bottom surface of header 12 each having a part to interpose as an obstruction to rods 42. Other alternatives to supply the function of plate 46, thrust rods 42 and holes 44 are (1) pivoting rods 42 on a vertical axis so that rods 42 may be moved into and out of the path of piston 38 and when in its path engaging the bottom face of header 12 and the top face of piston 38, (2) pivoting arms to header 12 which move outward to clear the piston and inward to engage the piston; or (3) any devices which can be caused to enter between the piston and header and prevent substantial movement thereof when the platens are in die-closed position.

It will, moreover, be clear that the benefits of this invention may be employed in the presently known machines which employ the toggle clamps. It will be understood that the adjustments of the toggle clamp is a critical matter, and that utilization of the full capacity of the toggle requires extreme care to avoid rupture or damaging strains in the machines or the dies. The large diameter piston 38 and cylinder 26 of the drawing may be employed respectively as a base for one end of the toggle linkage and rigidly attached to either the base of the machine or rigidly attached to the platen, depending upon where the designer prefers to dispose the large piston. With this addition, looser toggle fits are tolerable and the toggle may be extended fully to obtain its maximum thrust with minimum or zero lateral thrusts.

It will be evident also, that the holes 44 will be enterable or not depending upon whether the rods 42, are, or are not, in registry with holes 44. The piston 38 itself, carrying rods 42, can be constructed so that it rotates about its axis for which purpose the openings through bridge 30 for rods 42 are made arcuate and of sufficient arcuate extent to permit rotation of piston 38 and movement of rods 42 into and out of registry with holes 44. In this way the plate 46 may be omitted. It is evident that the arms 42 may themselves form a unit in the linkage by which such rotation may be effected. However, it is equally evident that piston 38 need not itself rotate, provided rods 42 may rotate about the piston axis free of the piston.

I claim:

An injection molding machine comprising, in combination, a stationary platen for holding a first mold part in a stationary position, a plurality of tie rods secured in parallelism to said stationary platen and extending substantially beyond the position of the stationary mold part, a header secured to the tie rods to form, between the header and the stationary platen, a substantial space for the operation and occupancy of moving parts of the machine between a retracted position adjoining the header and molding position adjoining the first platen, means providing a first cylinder secured to the header on the opposite side of the header from the space, a piston in said cylinder, a second platen slidably mounted on said tie rods in said formed space for supporting a movable mold part opposite the stationary mold part, means providing a second piston and cylinder assembly secured to the second platen, the piston of said second piston and cylinder assembly being mounted for limited movement within the cylinder of the respective assembly, said movable platen being carried by said second cylinder, the piston of said first cylinder having a piston rod extending through the header, said piston rod being secured to the end wall of said second cylinder to thereby allow movement of the first piston and second platen as a rigid unit toward and away from the stationary platen, a plurality of thrust rods secured to said second piston and extending through bores in the end wall of the second cylinder, said thrust rods being equally spaced about the axis of said cylinder and extending parallel thereto, means in said header forming passages for said thrust rods, means to abut said thrust rods against the header to prevent movement of the rods through said passages, and means for conducting a fluid under pressure to the second piston and cylinder to drive the second platen to move the mold parts together.

References Cited in the file of this patent

UNITED STATES PATENTS

| | | |
|---|---|---|
| 1,466,490 | Swenson | Aug. 28, 1923 |
| 2,355,613 | Wacker | Aug. 15, 1944 |
| 2,356,634 | Von Opel | Aug. 22, 1944 |